United States Patent

Wünscher et al.

[11] Patent Number: 6,059,508
[45] Date of Patent: May 9, 2000

[54] COMMISSIONING INSTALLATION

[75] Inventors: Eduard Wünscher; Karl Freudelsperger, both of Hart bei Graz, Austria

[73] Assignee: Knapp Holding GmbH, Hart bei Graz, Austria

[21] Appl. No.: 09/091,595

[22] PCT Filed: Dec. 18, 1996

[86] PCT No.: PCT/AT96/00251

§ 371 Date: Jun. 18, 1998

§ 102(e) Date: Jun. 18, 1998

[87] PCT Pub. No.: WO97/23394

PCT Pub. Date: Jul. 3, 1997

[30] Foreign Application Priority Data

Dec. 21, 1995 [AT] Austria .................................. 706/95 U

[51] Int. Cl.[7] .................................................. B65G 47/51
[52] U.S. Cl. ................ 414/276; 414/797.9; 198/370.01; 198/461.3
[58] Field of Search ..................... 414/276, 268, 414/285, 797.9; 198/367, 433, 370.01, 370.07, 461.3, 416

[56] References Cited

U.S. PATENT DOCUMENTS

| | | | |
|---|---|---|---|
| 3,193,078 | 7/1965 | Amenta et al. | 53/501 |
| 3,291,338 | 12/1966 | Gleason . | |
| 3,536,180 | 10/1970 | Dubus | 198/30 |
| 4,222,478 | 9/1980 | Gasser | 198/367 |
| 4,527,937 | 7/1985 | Tomasello, Jr. | 414/273 |
| 4,544,315 | 10/1985 | Muskulus | 414/797.9 |
| 4,724,947 | 2/1988 | Opperthauser | 198/433 |
| 4,921,128 | 5/1990 | Guigan et al. | 414/797.9 |
| 4,964,501 | 10/1990 | Hoffmann et al. | 414/797.9 |
| 4,974,719 | 12/1990 | Chenevard | 198/433 |
| 5,230,206 | 7/1993 | Christ | 53/501 |
| 5,269,646 | 12/1993 | Focke | 414/769.2 |
| 5,316,123 | 5/1994 | Achelpohl | 198/370.07 |
| 5,352,081 | 10/1994 | Tanaka | 414/276 |
| 5,478,183 | 12/1995 | Savigny | 414/276 |
| 5,482,422 | 1/1996 | Hammond | 414/276 |
| 5,573,368 | 11/1996 | Freudelsperger | 414/797.9 |
| 5,641,053 | 6/1997 | Nannini et al. | 198/461.3 |
| 5,746,572 | 5/1998 | Winski | 198/461.3 |

FOREIGN PATENT DOCUMENTS

| | | |
|---|---|---|
| 347856 | 1/1979 | Austria . |
| 0710611 | 5/1996 | European Pat. Off. . |
| 2940819 | 4/1980 | Germany . |

Primary Examiner—Gregory A. Morse
Attorney, Agent, or Firm—Sughrue, Mion, Zinn, Macpeak & Seas, PLLC

[57] ABSTRACT

In the commissioning installation described for automatically supplying items (18), such as cigarette cartons, computer-controlled from a storage region (1) comprising item stack throughput storage devices (2) to a transfer station (35) in accordance with commissioning orders, for each type of item (18) to be commissioned at least one throughput storage unit (2) with an associated single item ejector (10) as well as optionally also a throughput storage unit (2) with an associated multiple item ejector (14) is provided, wherein the ejectors (10; 14) eject the items (18) onto at least one collecting conveyor (3) which, via a sorting path (20), is followed by a conveying system (26) with branchings (29, 30, 31) which are followed by separate conveying branches (44, 45, 46) leading to separate transfer sites (32, 33, 34) in the transfer station (35).

9 Claims, 7 Drawing Sheets

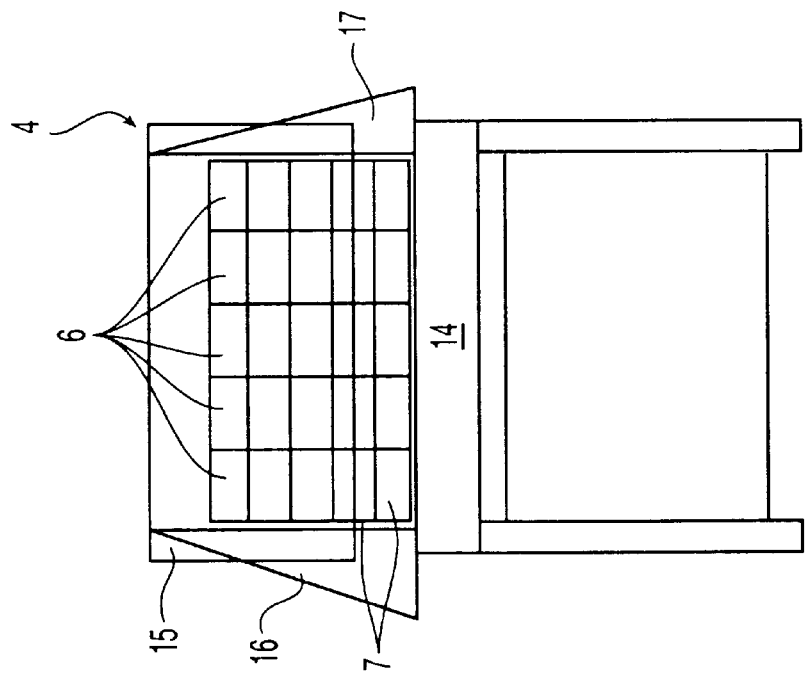
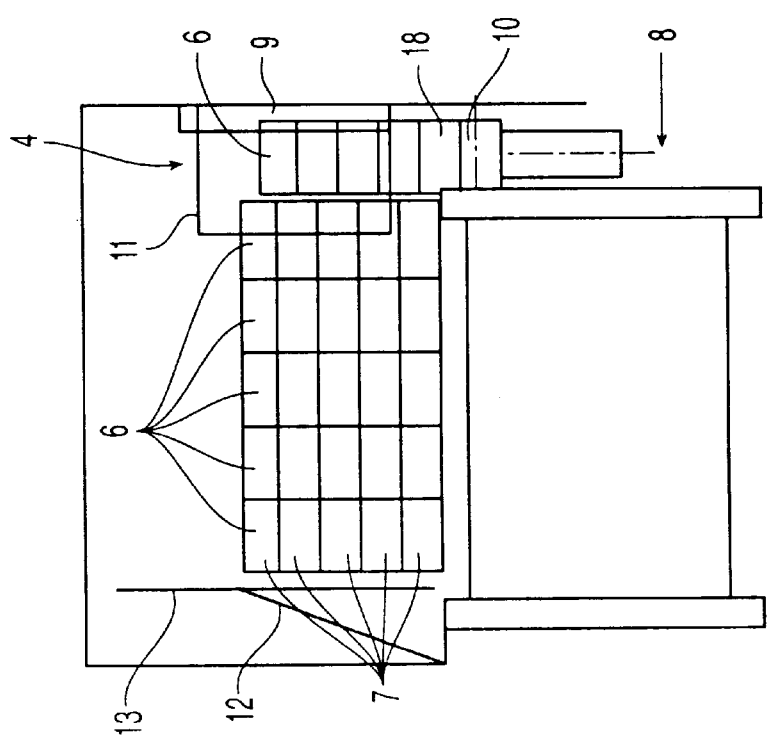
Fig. 4
Fig. 3

COMMISSIONING INSTALLATION

BACKGROUND OF THE INVENTION

The invention relates to a commissioning installation for the automatic, computer-controlled supply of items, e.g. tobacco products, from a storage region to a transfer station in accordance with commissioning orders.

Computer-controlled automatic commissioning installations are, e.g., known from AT 391 671 B (which corresponds to DE 32 13 119 A and to GB 21 18 156 A, respectively), but also from DE 22 26 769 A or from DE 27 36 197 A, DE 84 32 067 U or from FR 21 85 557 A, where, under the control of a computer and depending on the order to be commissioned, items are ejected from storage compartments arranged like shelves and containing the articles or items to be commissioned onto a conveyor belt passing them: the conveyor belt in turn supplies the commissioned items collected per commissioning order to a commissioning container; allocation between the commissioning container and the items is effected computer-controlled according to the commissioning order, and for this purpose the commissioning containers also have optically or magnetically detectable labels so as to ensure this allocation in the correct manner. The commissioning containers are transported on a transverse conveyor which is arranged at a somewhat lower level than the conveyor belt that passes the storage compartments, so that the latter can drop the items according to the respective commissioning order into the commissioning containers passing by on the transverse conveyor.

These known commissioning installations have proved suitable particularly in those cases in which a great plurality of items of rather small dimensions are to be manipulated, in which a commissioning order can be fulfilled without any problems with a commissioning container, in which comparatively little place is required per commissioning order on the conveyor belt, so that the individual commissioning orders can be handled successively and may lead to "heaps" of items on the conveyor belt, and in which also dispatch of the items commissioned by aid of the commissioning containers can be effected successively from one and the same site.

However, these known commissioning installations are not considered to be suitable if the items to be commissioned have greater dimensions, are present in a not too large plurality of different types, yet where there are optionally relatively high throughput rates per type of item. This is, e.g., so in case of tobacco products, such as, in particular, cigarette cartons. In such cases of commissioning, the known commissioning installations have proved to be poorly flexible and not sufficiently quick.

SUMMARY OF THE INVENTION

It is thus the object of the invention to provide a commissioning installation with which, for items of comparatively large dimensions, a particularly quick commissioning and passage up to a transfer or packing is made possible, wherein, moreover, the fact that different kinds of items may have comparable dimensions should be utilized, so that irrespective of the comparatively large dimensions, a similar manipulation of all items can be provided for the accelerated passage through the installation. Such a situation is, e.g., found in case of cigarette packages packed in cartons, the cartons of cigarettes, even though they may contain different brands of cigarettes, having comparative dimensions (even though they may vary between relatively elongate and cube-shaped) and may be manipulated—automatically—in comparable manner from storage to packaging.

The commissioning installation according to the invention thus is characterized in that the storage region is formed with throughput storage means, in particular item stack throughput storage means, that for each type of item to be commissioned at least one througput storage unit is provided with an associated single item ejector as well as in case of items with a high throughput rate, optionally also a throughput storage unit with an associated multiple item ejector, that the ejectors are arranged at least on one longitudinal side of at least one collecting conveyor, e.g. a conveyor belt, onto which they eject the items, that a conveying system having branchings and associated shunts follows upon the collecting conveyer, e.g. via a sorting path, and that separate conveying branches follow upon the branchings, e.g. via conveyors generally conveying transversely away from the former, which conveying branches lead to separate transfer sites in the transfer station.

With such a commissioning installation, the aforementioned objects are met in an advantageous manner, and the comparatively large items, such as cigarette cartons or the like goods which are present in not too large numbers in various brands can be commissioned in an extremely efficient manner and packed at transfer sites and transferred. By the fact that throughput storage units are each provided for a plurality of items of one and the same kind, wherein, moreover—according to DE 195 11 364 A—also several adjacently arranged rows of item stacks may be contained, tribute is paid to the fact that the items have relatively large dimensions and, with a corresponding throughput, also the storage place required will be larger than in case of a single item storage channel; furthermore, thus the refilling procedures will be required only to the extent common. If the items concerned are items having particularly high throughput rates, i.e. items which are often demanded in large numbers, the items commissioned may additionally be provided in throughput storage means having multiple item ejectors; there, it is possible to push out not only one cigarette carton (the lowest one in a stack), but several, e.g. five, adjacent cigarette cartons (the lowest ones in several, e.g. five, adjacently arranged stacks) onto the conveyor collecting the items.

The ejected items are supplied to a common conveying system, optionally after having been longitudinally aligned (which may be favorable with a view to the kind and size of the items indicated, such as, particularly cigarette cartons, with a view to their further transportation and supply to the individual transfer sites), which common conveying system comprises a conveying technique according to which a single conveyor branches into two or more conveyors, for which a respective shunting technique can be used. These branchings or branched conveyors are finally followed by the conveying branches leading to the separate transfer sites, these transfer sites inclusive of the conveying branches in particular being arranged laterally of the branched conveying system so as to achieve a generally compact, space-saving commissioning installation. In contrast to the initially explained known commissioning installations, with the present commissioning installation thus the items are not commissioned into containers associated to the individual commissioning orders, but are transferred to the conveying system and transported to the separate transfer sites in accordance with the individual commissioning orders. At the transfer sites, the thus sortedly arriving items may be presented in a manner that they can be packed in dispatching bundles in a simple and time-saving manner. This may be effected automatically or also by hand, possibly with apparatus aiding packaging, such as stops, etc.

With this type of commissioning in which always certain items which are consecutively transported in sorted manner are associated to a certain transfer site, commissioning suitably is effected such that always one commissioning order is handled completely, i.e. the various types of items (in particular the different cigarette cartons containing different brands of cigarettes) are ejected according to a commissioning order and are supplied to a certain transfer site; however, it is also quite possible to handle several commissioning orders simultaneously in interleaving manner, similar to a "time sharing" system, e.g. by successively ejecting items of one and the same type associated to different commissioning orders and putting them onto the conveying system where they are then supplied to the associated different transfer sites, before items of a different type are ejected correspondingly according to the current commissioning orders to be handled, and conveyed to the transfer sites until finally the commissioning orders have been completed.

For a suitable and energy-saving design of the throughput storage devices it is particularly advantageous if the throughput storage units are designed with roller paths downwardly inclined from the filling side towards the associated ejector. In such roller path throughput storage devices, the items stacked therein can move from the filling side towards the ejector side on account of gravity without requiring a separate drive therefor. If the downward inclination is not very steep and just sufficient for the item stacks to move on, there will also be no problem at the delivery side that a high portion of the weight of the entire item stack in the storage means would have to be accommodated by respective retention elements; in the case of cigarette cartons and the like items, an inclination of aproximately 5° has proven particularly suitable. The inclination in the region of the ejectors themselves may be somewhat steeper, e.g. approximately 15°, so as to ensure a rapid onward movement of one item stack row each to the ejectors after a shifting out procedure. Furthermore, to have a sufficient number of items availabe in the ejectors at any time, and to thus be able to respond quickly to the respective commissioning orders, it has furthermore also proven advantageous if commissioning heads are provided for the ejectors each receiving several item stacks and comprising retention plates releasing at least the lowermost layer of the stacks yet holding back the upper stack layers. There, e.g., always several stacks are simultaneously adjacently moved on into the ejectors, irrespective of whether then these stacks, e.g. according to the technique of DE 195 11 364 A, are laterally shifted to a shift-out site having an individual ejector or whether always all the lowermost items of all stacks in a row are adjacently simultaneously ejected in the ejector or commissioning head, respectively, by aid of a multiple ejector and as controlled by the computer.

To sort the items deposited on the collecting conveyor in particular lengthwise one behind the other (optionally—if desired—also in transverse alignment to the conveying direction one behind the other), the sorting path may be equipped with corresponding mechanical structural guiding parts. For an alignment in longitudinal direction it has proven particularly suitable if the sorting path is set up with progressively faster moving conveyors, at whose upper side furthermore directing means for the items may be attached for providing the items individually and in alignment. With a sorting path designed in this manner each consecutive conveyor which moves more rapidly than the preceding conveyor pulls the items away from the preceding conveyor resulting in a longutudinal alignement of the items in conveying direction and providing them individually, which may additionally be aided by the directing devices arranged above these conveyors. In practice, e.g. two progressively more rapidly moving conveyors, in particular conveyor belts, may form the sorting path.

For the orderly and reliable transfer of the items from the branched conveying system to the individual conveying branches each leading to the associated transfer site it is furthermore advantageous if each conveyor conveying transversely away from the associated branching follows at the front side of the respective conveying system branching, via a front side ascending conveyor. Such an ascending conveyor receives the successively transported items from the respective conveying system branching and conveys them slightly ascending to the consecutive—horizontal—transverse conveying means onto which the items, provided they are correspondingly rigid, as is the case with cigarette cartons and the like items, fall down under tilting from the ascending conveyor delivery end so that they can be conveyed away in transverse direction, wherein also their alignment is hardly changed. In this connection it has furthermore proven particularly suitable if the ascending conveyor is drivable continuously at a high conveying speed as compared to the conveying speed of the conveying system. The conveying speed of the ascending conveyors may be such that they "shoot" the itms (e.g. cigarette cartons) onto the transverse conveyor so that the longitudinal alignment of the items is maintained and the latter are transported off widthwise on the transverse carrier. The ascending conveyor may e.g. preferably have an ascent of approximately 5°. The ascending conveyor may be realized e.g. by aid of a short ascending conveyor belt; similarly, the conveying means of the collecting conveyor, the sorting path as well as also of the conveying system and the transverse coveyors may be realized by conveyor belts in a manner known per se; naturally, also all other conveying techniques, in particular with driven rollers, are conceivabel and possible. With a view to the particularly safe entrainment during acceleration or during the lateral transporting away, at least in these regions preferably conveyor belts are used, in particular such having particularly good grip, non-skid surfaces. On the contrary, the conveying branches leading to the transfer sites simply may be formed by roller paths downwardly inclined in conveying direction, so that here, too, —as in the throughput storage units—no separate driving means are required, wherein, on the other hand, the conveying speed is quite sufficient to supply the items width-wise successively to the transfer site. The downward inclination of the roller paths may, e.g., be approximately 30 to 50.

To facilitate handling during packing, it is, finally, also advantageous if at the individual transfer sites, slides are associated with the conveying branches, which slides are slidable transversely to the conveying direction, particularly for a group-wise shifting of items towards one edge of a packing table.

The invention will now be further explained by way of the preferred exemplary embodiments illustrated in the drawings to which, however, it shall not be restricted.

BRIEF DESCRIPTION OF THE DRAWINGS

FIG. 3 shows a schematic view of a throughput storage unit equipped with a single item ejector according to arrow III in FIG. 5;

FIG. 4 shows a corresponding schematic view—according to arrow IV in FIG. 5—in the case of a multiple item ejector;

DETAILED DESCRIPTION OF THE INVENTION

Figure 1:
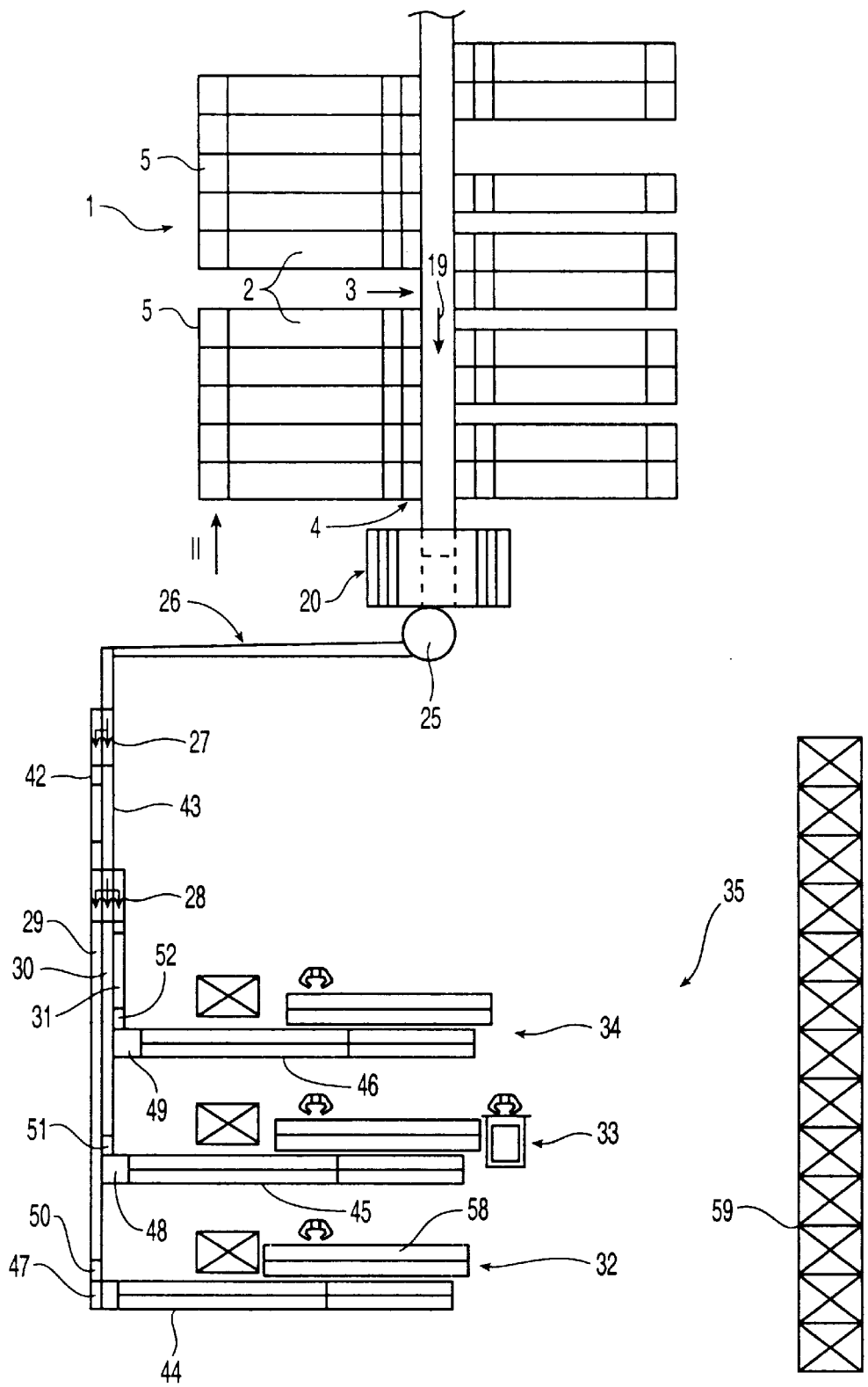
FIG. 1 schematically shows a general top view onto a commissioning installation.

The commissioning installation quite schematically illustrated in FIG. 1 according to an embodiment which, at least presently, is considered to be particularly preferred comprises a storage area 1 only partly illustrated and having throughput storage units 2 which contain adjacently arranged stacks of items, e.g. 5×5 (cf. also FIGS. 3 and 4) in successive rows and which are combined in shelf-like manner. They are arranged, e.g., at either side of a central belt 3 provided as a collecting conveyor, onto which the items contained in the storage units 2 are shifted or ejected under the control of a computer and by aid of comissioning heads 4. At the filling side of the storage units 2, loading tables 5 are provided for refilling items into the storage units 2.

Figure 2:
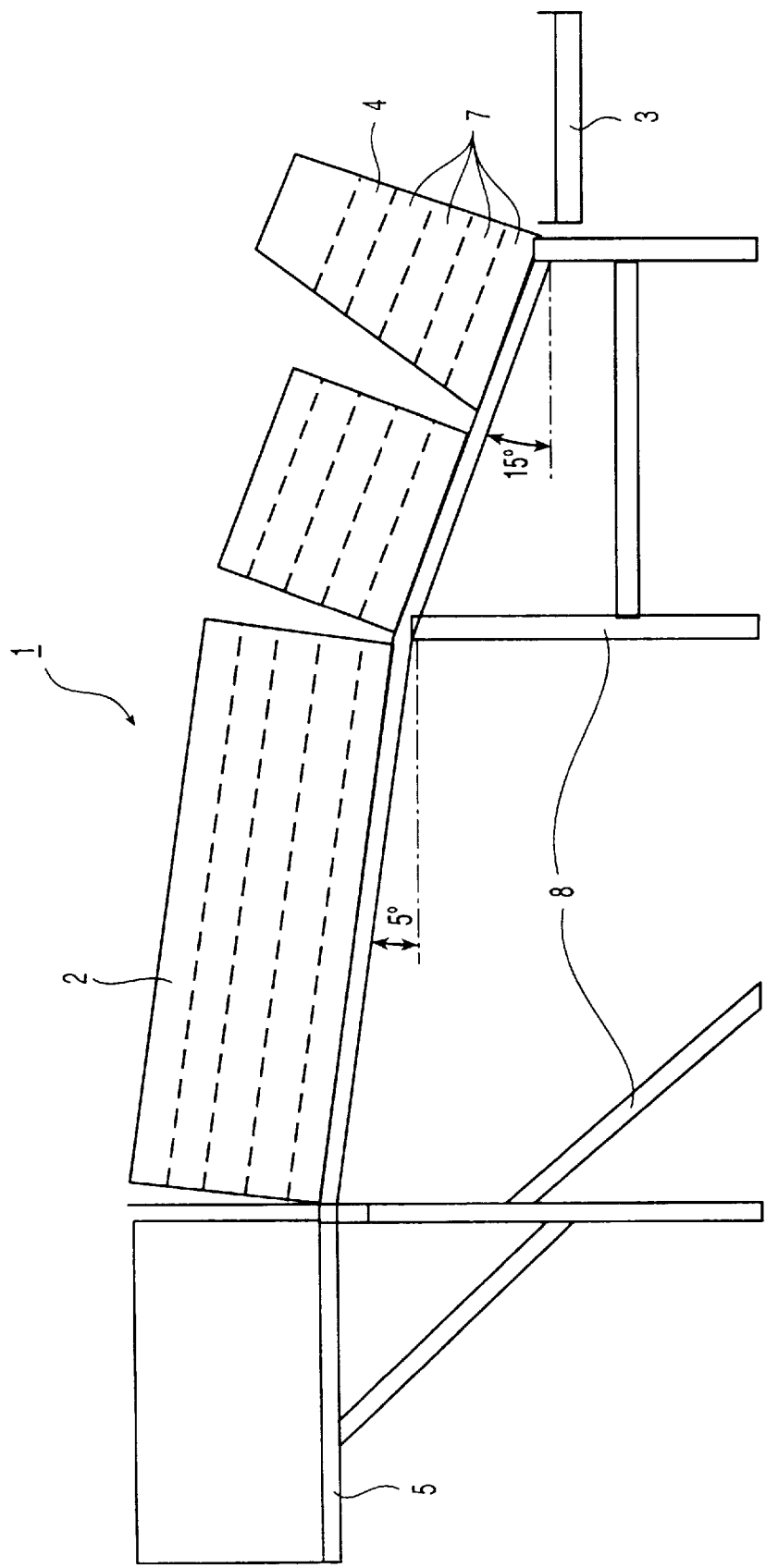
FIG. 2 shows a schematical side view of a throughput storage unit of this commissioning installation, substantially according to arrow II in FIG. 1.

Within the throughput storage units 2, the items arranged in stacks, e.g. cigarette cartons, pass to the commissioning head 4, the storage means according to FIG. 2 in particular being designed as roller paths inclined under e.g. 5° so that product stacks, due to gravity, continue to be conveyed automatically towards the ejector.

The individual product stacks of a 5×5 throughput storage means 2 and of the associated commissioning head 4 according to FIG. 3 or 4 are denoted by 6 in these Figures, and the individual product layers within one stack are denoted by 7.

From FIG. 2 it is then apparent that the ejector regions are downwardly inclined steeper than the associated product storage means itself, e.g. by approximately 15°. Each one of the structural groups comprised of loading table 5, item stack throughput storage means 2 and ejector 4 may have a common stand 8, as is apparent from FIG. 2.

In FIG. 3, one example of an item stack throughput storage means having an ejector unit in the form of a single item ejector 10 is schematically illustrated, wherein a group of five stacks is simultanously advanced into the commissioning head 4 which has a separate shift-out space 9 from which the border-side stack 6 (according to the illustration in FIG. 3, the one located furthermost to the right) is ejected continuously from bottom to top by aid of the single item ejector 10 (e.g. in the form of an ejector belt; however, also a different ejector may be provided, such as, e.g., a pneumatic slide). A merely quite schematically shown retention plate (retention sheet) 11 serves to hold back the upper layers of the stack 6 located furthermost to the right in FIG. 3), while the lowermost item of this stack 6 can be ejected by aid of the ejector 10. In FIG. 3 at the other side, at 12 a lateral guiding sheet is schematically provided for the stack 6 arranged at the left-hand edge in FIG. 3.

Such an ejector 10, as shortly explained by way of FIG. 3 above, is known per se from DE 195 11 364 A, and thus no further explanations are required in this respect. It should merely be mentioned that after having reached the commissioning head 4, the frontmost item stack group illustrated in FIG. 3 will be laterally shifted stack by stack, i.e. by aid of a merely quite schematically indicated, e.g. pneumatically actuated, transverse slide 13, so as to transfer one stack 6 after the other one into the shift-out space 9.

On the other hand, FIG. 4 schematically illustrates a multiple item ejector commissioning head 4, and again the item stacks 6 are transported through the throughput storage means to the commissioning head 4 in groups, e.g. always 5 stacks one beside the other, with 5 items superposed per stack. In detail, a correspondingly wide ejector belt 14 may serve as the multiple item ejector, this ejector belt 14 being illustrated only schematically in FIG. 4, which ejects the lowermost layer 7 of all item stacks 6 simultaneously at a corresponding control by the computer, whereas the layers arranged thereabove are held back by a corrspondingly wide retention plate (retention sheet) 15. Lateral guiding sheets 16, 17 serve to guide the stack 6 at its entry into the commissioning head 4 and during shifting out from the same, cf. also FIG. 5 in addition to FIG. 4.

Figure 5:
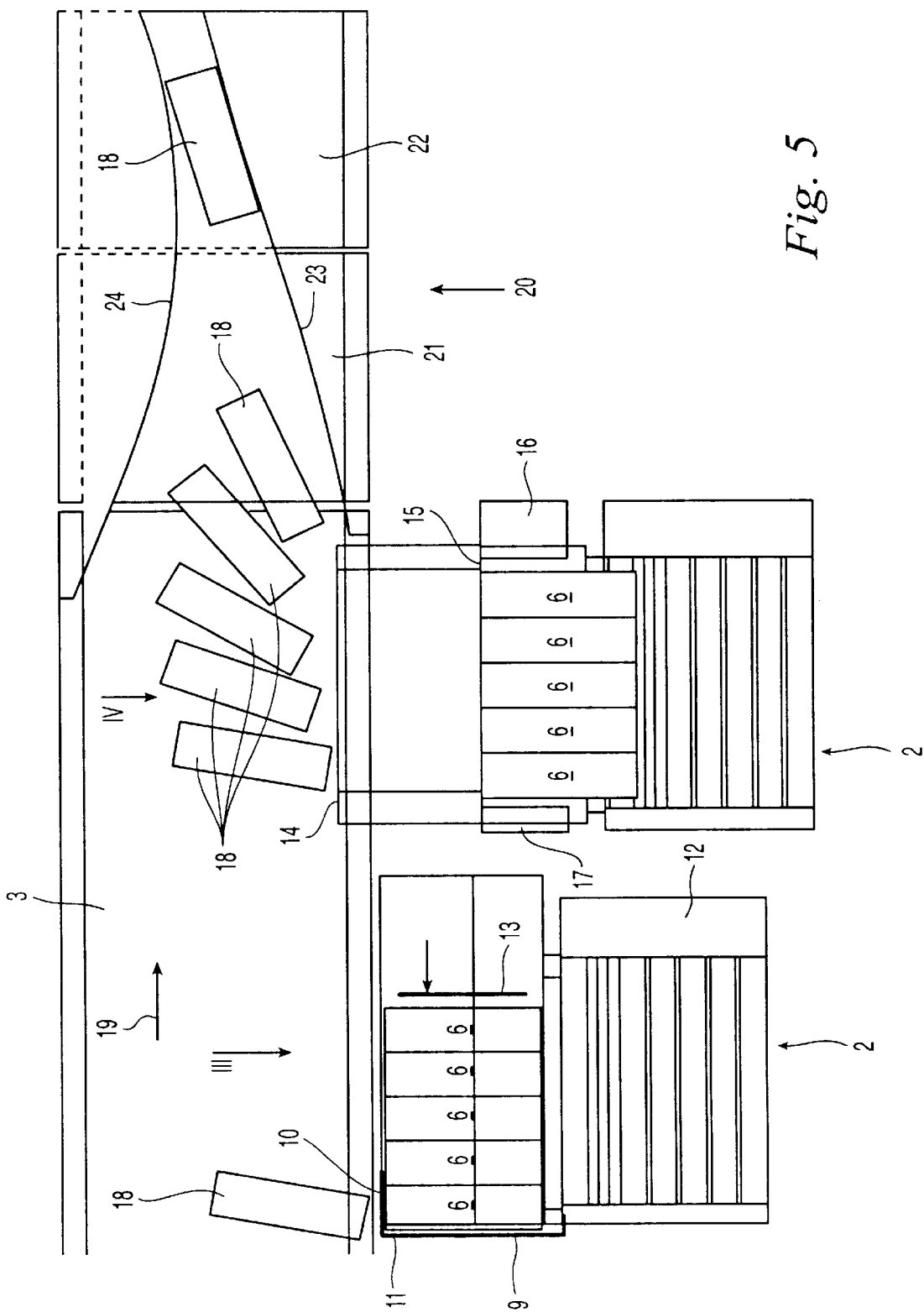
FIG. 5 shows a schematic top view onto a part of the collecting conveyor with adjoining sorting path, together with throughput storage units having multiple item ejectors and single item ejectors, respectively.

From FIG. 5, a schematic top view onto the arrangement of two adjacently provided item stack througput storage units 2 with a single item ejector commissioning head 4 according to FIG. 3 (cf. arrow III in FIG. 5), on the one hand, and with the multiple item ejector commissioning head 4 according to FIG. 4 (cf. arrow IV in FIG. 5), on the other hand, can be seen, wherein the situation is shown according to which both the single item ejector 10 and the multiple item ejector 14 have just shifted out item 18, such as, in particular, cigarrette cartons, onto the collecting conveyor 3 formed by a conveyor belt (so-called central belt). The conveying direction of the conveyor belt 3 is illustrated by an arrow 19.

As is then apparent from FIG. 1 and particularly FIG. 5, the conveyor belt 3 transfers the shifted out items 18 to a sorting path 20 which, e.g. according to FIG. 5, is formed with two belts 21, 22 following on the conveyor belt 3 and moving progressively more rapidly, as well as by directing devices of the type of directing plates 23, 24 arranged thereabove. This sorting path 20 thus receives the individual items 18 (cigarette cartons) from the collecting conveyor belt 3 at an increased speed and accelerates them further so that the items 18 are entrained, whereby these items are provided individually and aligned lengthwise in the conveying direction. This alignment and sorting is additionally aided by the directing devices 23, 24.

According to FIG. 1, the items 18 are then transferred from the sorting path 20 via a rotating transfer table 25 to a conveying system 26 having several branchings, as schematically illustrated at 27 and 28 in FIG. 1. To this end, shunting systems known per se can be used which lead the items 18 according to the commissioning orders computer-controlled to the desired branchings, e.g. 29, 30 or 31, so as to allocate the respective items 18 according to the commissioning orders to individual transfer sites 32, 33, 34 of a transfer station 35.

Figure 6:
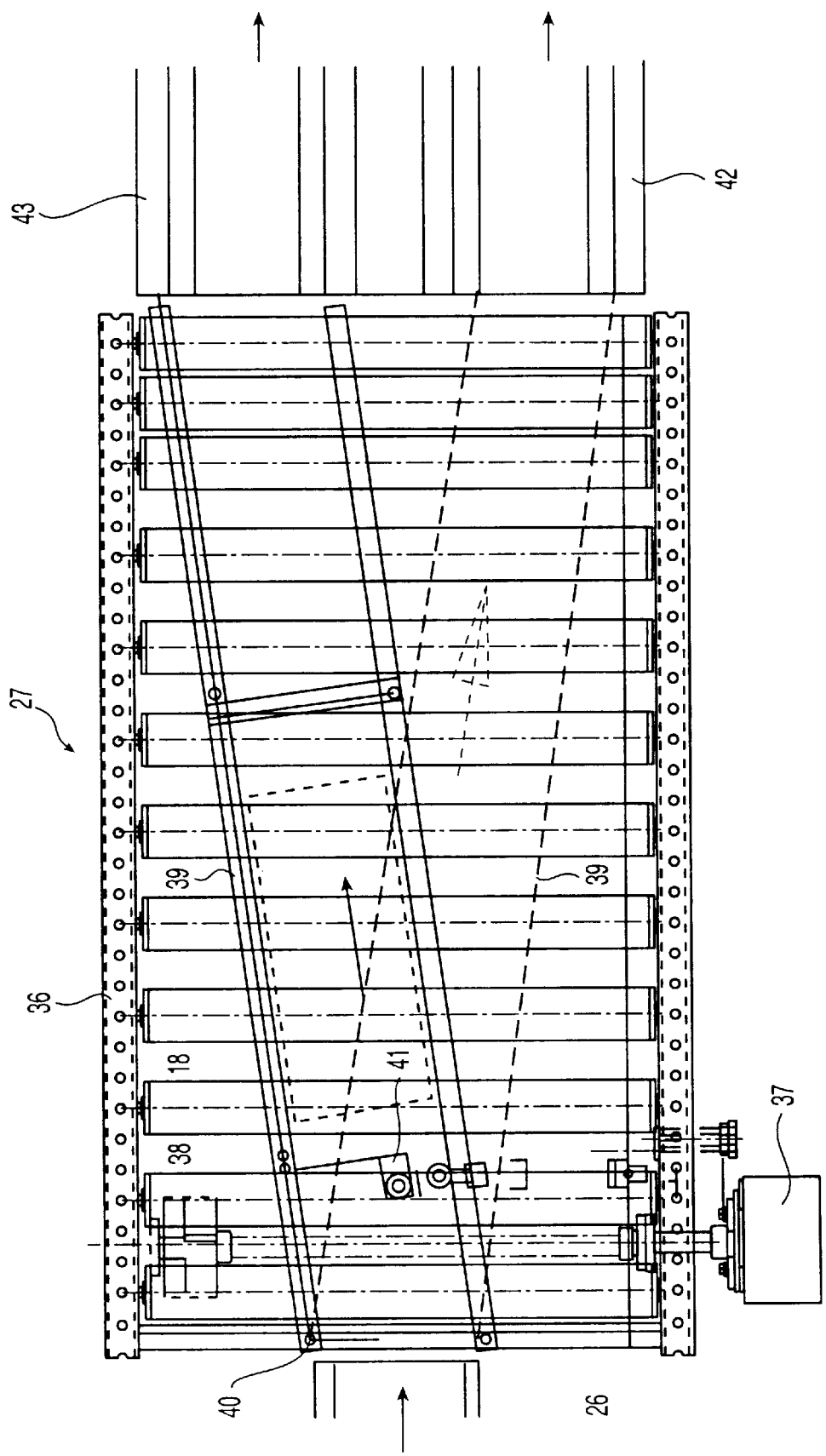
FIG. 6 shows a top view onto a shunt.

In FIG. 6, an example for a shunt 27 is schematically illustrated in top view; as can be seen, a roller path 36 comprising driven (see motor 37) rollers 38 is provided, and at the upper side thereof directing rails 39 extending parallel to each other are attached to be horizontally pivotable about pivot points 40 by aid of a pivoting drive 41 so as to supply the items 18 (illustrated in dot-and-dash lines in FIG. 6) alternatively to one of two successive conveyor belts 42, 43 (cf. also the dashed position of the directing rails 39).

The one belt, e.g. 43, can be followed by a descending or ascending belt so as to obtain a distribution in the vertical direction. The shunting unit 28 according to FIG. 1 may actually have the form of two superposed 3-branch shunts, each providing a triple branching in superposed planes, in FIG. 1 only the upper branchings 29, 30, 31 being visible.

Figure 7:
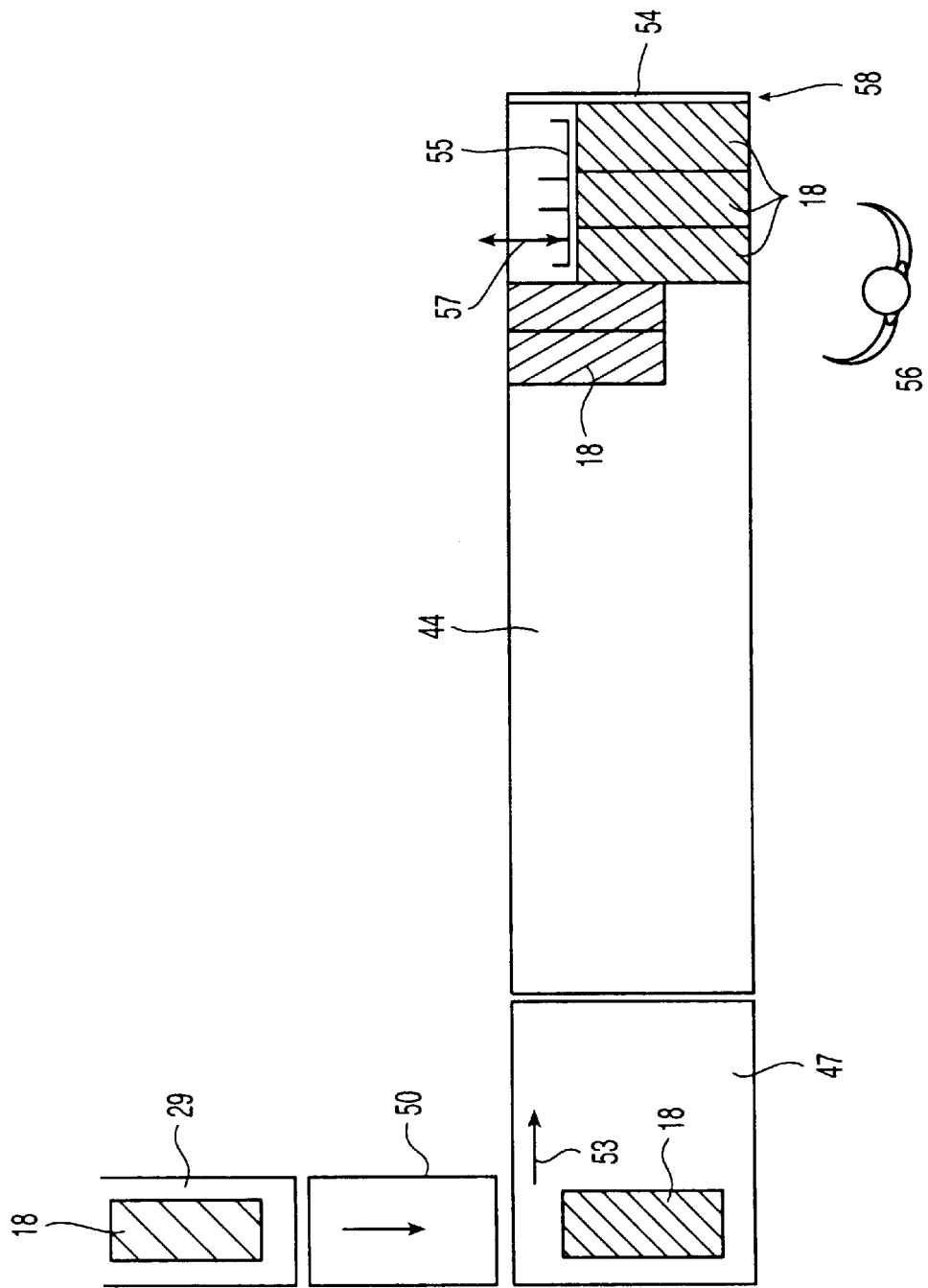
FIG. 7 shows a schematic top view onto the region of a transfer site.
Figure 8:
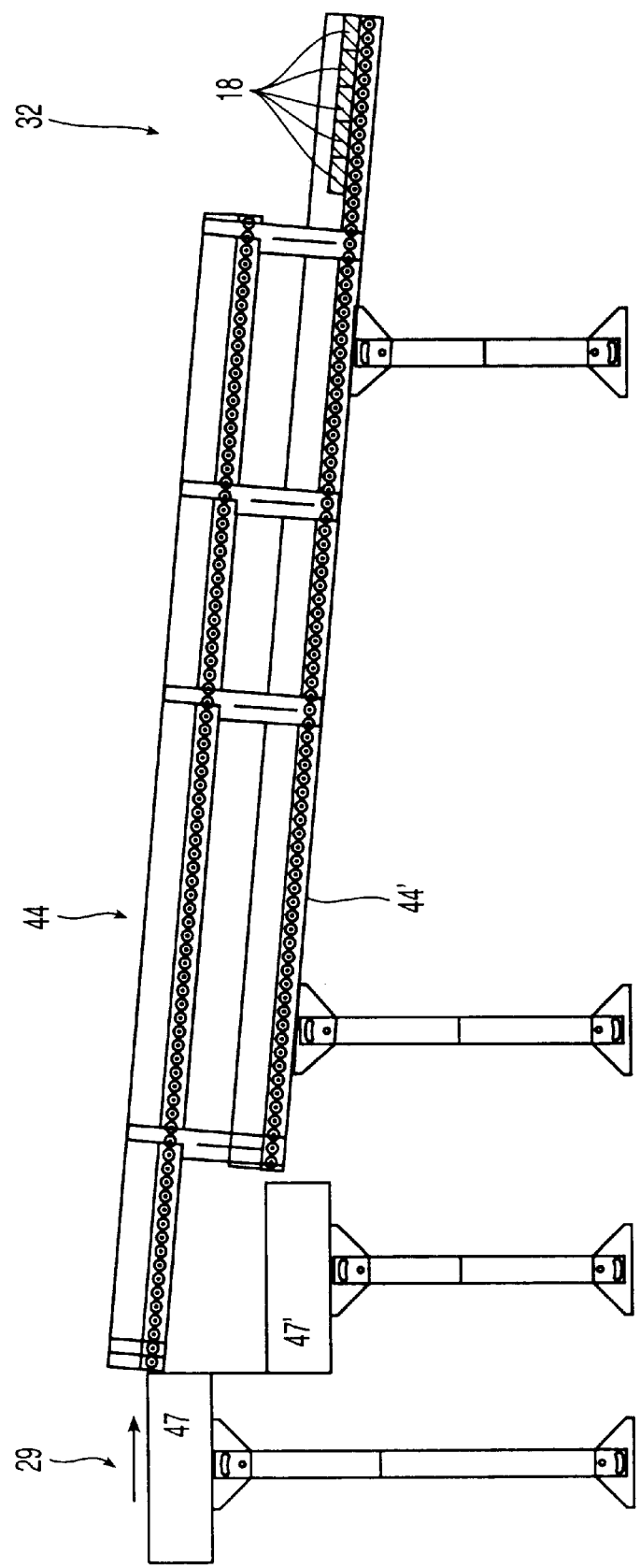
FIG. 8 shows an associated side view of such a transfer site.

To supply the respective items 18 according to the individual commissioning orders to the corresponding transfer sites 32, 33, 34, the conveyor system branchings 29, 30, 31 are followed by conveyor branches 44, 45, 46 extending transversely to the former, and to realize these conveyor branches, simply downwardly inclined roller paths may be provided, cf. also FIG. 8 in which also the previously effected vertical distribution or branching which had taken place at 27 is visible, see also the lower conveyor branch 44'. In detail, these conveyor branches 44, 45, 46 also follow upon ascending conveyors in the form of short ascending belts 50, 51, 52 via transverse conveyors designed as transverse belts 47, 48, 49, cf. also FIG. 7 in addition to FIGS. 1 and 8, and these ascending belts 50, 51, 52—just like the transverse belts 47, 48, 49—are driven at a comparatively high speed, so that, on the one hand, the ascending belts 50, 51, 52 transport the items 18 with substantial acceleration and more or less "shoot" them onto the successive transverse belt 47, 48 or 49, whereupon the also rapidly circulating transverse belt 47, 48, 49 can receive the items 18 in the given (longitudinal) alignment and supplies them —now width-wise—to the respective roller path 44 or 45 or 46, respectively, cf. also arrow 53 in FIG. 7.

At the end of the respective rollerpath 44, 45, 46, according to FIG. 7 the items 18 may abut against a stop 54, and in the exemplary embodiment according to FIG. 7 a group of items 18 is shifted towards a schematically indicated operator 56, cf. arrow 57, by aid of a transversely movably arranged slide 55, activated by a sensor or limit switch (microswitch) not illustrated in detail, so as to facilitate manipulation of the items 18 during packaging. The arrangement may be as illustrated in FIG. 7, the end of the roller path 44 forming a packing-table like zone 58; the arrangement may, however, also be as schematically illustrated in FIG. 1, where separate packing tables are available for the operating personnel.

From FIG. 1 furthermore a dispatching region 59 is apparent, from which the bundles ready for dispatch are transported away.

The computer control for the commissioning installation described may be designed in a per se conventional manner, wherein the items 18 according to the commissioning orders received are commissioned from the througput storage means 2 onto the collecting conveyor belt 3 and then are supplied to the separate transfer sites 32, 33, 34. What must be taken into consideration is that the respective branchings 29, 30, 31 are controlled via the shunts 27, 28 which, due to the speed of the conveyor belts, is quite possible considering the respective transporting time for the items 18 starting from commissioning onto the central belt 3 up to the reaching of the branchings. The commissioning orders can also be started at the transfer station 35, and preferably they are transmitted from a customer's computer to the commissioning installation.

The dispatch bundles in which the items 18 are packaged at the transfer station 35 may be separate plastic, metal or cardboard containers, suitably, however, the empty original boxes are used which are incurred at the loading tables 5 in the storage region 1 and which are transported to the transfer station 35 after having been emptied.

Within the scope of the present commissioning installation it is, of course, also possible to arrange collecting or central belts 3 superposed on several levels or planes to which the items 18 are supplied from respectively superposed storage units or item stack throughput storage means 2 with associated ejector units (commissioning heads 4) according to the commissioning orders. Consequently, the conveying system 26 may also be operated from the beginning on several superposed planes, and the vertical branchings, such as at 27, can be omitted. The throughput storage means 2 or commissioning heads 4 may then extend not only at a right angle to the central belt 3, as is illustrated and preferred, but also under an acute or obtuse angle deviating from 900 relative to the central belt 3. The throughput storage means 2 may further be designed such that the item stacks can be refilled into the throughput storage means 2 directly from their original package boxes (from the factory) whithout each individual item having to be handled.

In operation, according to a commissioning order called in from the transfer station 35, e.g. five cigarette cartons 18 of a first brand (at a multiple-item ejector commissioning head, FIG. 5, right-hand unit), furthermore e.g. one cigarette carton 18 of a second brand (single-item ejector commissioning head at the left-hand side in FIG. 5) as well as further cigarette cartons of further brands are ejected onto the conveyor belt 3. Throughput storage units 2 may be arranged at both sides of the conveyor belt 3, even with different widths corresponding to different items or types of items with different throughput quantities, as is schematically indicated at the right-hand side of the conveyor belt 3 in FIG. 1.

The items 18 thus commissioned onto the conveyor belt 3 which are part of one commissioning order, are taken hold of in the sorting path 20 by the ever faster moving conveyor belts 21, 22 with surfaces that have a respective good grip, and are accelerated and thus moved apart and aligned length-wise. From the sorting path 20, the items 18 are then transferred to the conveying system 26, where the items of a commissioning order are directed to a given branching, e.g. 29, where they move towards the transverse belt, e.g. 47, branching off at a right angle, are accelerated on the respective ascending belt, e.g. 50, and then are laterally moved away under an angle of 90° with acceleration on the transverse belt, e.g. 47; subsequently, the items 18 roll down the respective roller path, e.g. 44, cf. also the lower roller path 44' in FIG. 8, at whose lower end five items 18 are illustrated. It should be mentioned that on one packing table plane, cf. also FIG. 1, depending on the product dimensions, e.g. up to forty products—in case of narrow products even more—can be placed ready one beside the other.

From the preceding description it also results that per transfer site, e.g. 32 (cf. also FIG. 8), the commissioned items 18 can be supplied in several, e.g. two, levels so as to already collect and get ready the items 18 for the next commissioning order while the items 18 of one commissioning order are packed.

What is claimed is:

1. A commissioning installation for supplying elongate items automatically under computer control from a storage region to a packaging station in accordance with commissioning orders and without using commissioning containers, wherein the storage region comprises a plurality of storage units through which the items may move to an ejector end, at least one respective storage unit being designated for each type of item to be commissioned, the items being adjacently arranged in stacks aligned in the longitudinal direction of each storage unit, wherein at least one of the storage units includes a single item ejector and, for items with a high throughput rate, at least one other storage unit includes a multiple item ejector, said item ejectors being arranged on at least one longitudinal side of at least one collecting conveyor having an item conveying direction and onto which the item ejectors directly eject the items so that the items come to lie transversely to the item conveying direction of the collecting conveyor, said commissioning installation further comprising sorting means for receiving said items from said at least one collection conveyor and providing the items individually and longitudinally to a conveying system, said conveyor system including branching means for allocating said items to a plurality of separate supply conveyors disposed parallel to each other, a plurality of branching conveyors disposed transversely with respect to said supply conveyors for conveying said items to respective packaging sites in said packaging station and transfer means for transferring said items from said supply conveyors to said branching conveyors.

2. A commissioning installation according to claim 1, wherein the collecting conveyor is formed by a conveyor belt.

3. A commissioning installation according to claim 1, wherein the storage units are provided with downwardly inclined roller means for transferring the items by gravity from a filling side to an ejector end.

4. A commissioning installation according to claim 1, wherein said sorting means is adapted to receive a plurality of item stacks and including a retention plate engaging said stacks for releasing at least the lowermost layer of the stacks while holding back the upper stack layers.

5. A commissioning installation according to claim 4, further comprising a first conveyor for receiving said lowermost layer of the stacks transversely to a direction of movement of the first conveyor, a second conveyor receiving items from said first conveyor and a third conveyor moving faster than the second conveyor for receiving said items from said second conveyor and guide means located above said second and third conveyors for engaging said items and aligning said items longitudinally on said third conveyor for transfer to said conveyor system.

6. A commissioning installation according to claim 1, wherein said transfer means includes upwardly inclined conveyors disposed in alignment with respective supply conveyors wherein said upwardly inclined conveyors operate at a higher speed than said supply conveyors and are inclined at approximately five degrees.

7. A commissioning installation according to claim 6, further comprising a plurality of transverse belts for receiving items from respective upwardly inclined conveyors for conveying items transversely away from the upwardly inclined conveyors.

8. A commissioning installation according to claim 7, wherein the branch conveyors leading to the transfer sites are aligned with said transverse belts, respectively and are comprised of downwardly inclined roller conveyors for transferring the items under gravity.

9. A commissioning installation according to claim 1, wherein each of said branch conveyors have associated slides slidable transversely relative to the conveying direction of the branching conveyors for shifting items towards one edge of a packing table.

* * * * *